(12) United States Patent
Peabody (10) Patent No.: US 10,813,485 B2
(45) Date of Patent: Oct. 27, 2020

(54) PORTABLE LOCK FOR TOILET STALLS (71) Applicant: Hanchett Entry Systems, Inc., Phoenix, AZ (US)

(72) Inventor: Joshua T. Peabody, Phoenix, AZ (US)

( * ) Notice: Subject to any disclaimer, the term of this patent is extended or adjusted under 35 U.S.C. 154(b) by 0 days.

(21) Appl. No.: 16/023,002

(22) Filed: Jun. 29, 2018

(65) Prior Publication Data

US 2020/0000260 A1 Jan. 2, 2020

(51) Int. Cl.
| | | |
|---|---|---|
| *A47G 25/08* | (2006.01) | |
| *A47G 25/06* | (2006.01) | |
| *F16B 2/18* | (2006.01) | |
| *F16M 13/00* | (2006.01) | |
| *F16M 13/02* | (2006.01) | |
| *F16B 2/10* | (2006.01) | |

(52) U.S. Cl.
CPC ......... *A47G 25/08* (2013.01); *A47G 25/0607* (2013.01); *F16B 2/10* (2013.01); *F16B 2/18* (2013.01); *F16M 13/022* (2013.01)

(58) Field of Classification Search
CPC ...... A47G 25/08; A47G 25/06; F16M 13/022; G09F 7/18; G06F 1/1601; A63F 13/06; F16B 2/10; F16B 2/18
USPC ............. 248/229.21, 229.11, 229.12, 223.13
See application file for complete search history.

(56) References Cited

U.S. PATENT DOCUMENTS

| | | | | |
|---|---|---|---|---|
| 1,590,133 A | * | 6/1926 | Tennyson ............... | E05C 19/182 292/294 |
| 2,803,278 A | * | 8/1957 | Dean ...................... | E05C 19/182 269/243 |
| 3,173,674 A | * | 3/1965 | Ringle ...................... | F16B 2/12 269/97 |
| 4,076,228 A | * | 2/1978 | Sheldon .................... | B25B 5/10 269/243 |
| 4,979,945 A | * | 12/1990 | Wade ................... | A61M 5/3213 206/365 |
| 5,156,508 A | * | 10/1992 | Grisley .................... | B25B 5/08 269/236 |
| 5,692,734 A | * | 12/1997 | Aldredge, Sr. ........... | B25B 1/08 269/166 |
| 6,145,789 A | * | 11/2000 | Matlin .................... | A63H 27/04 244/137.4 |
| 6,145,798 A | * | 11/2000 | Janisse .................. | F04D 29/601 248/229.1 |
| 6,375,138 B1 | * | 4/2002 | Balchan .................... | G09F 7/18 248/229.15 |
| 6,378,826 B1 | * | 4/2002 | Knaub .................... | A63F 13/06 248/229.1 |
| 6,481,681 B1 | * | 11/2002 | Stunkel ................. | G06F 1/1601 248/187.1 |
| D709,979 S | * | 7/2014 | Prieto .......................... | D22/108 |
| 2011/0018287 A1 | | 1/2011 | Wise | |
| 2019/0048632 A1 | | 2/2019 | Enos et al. | |

* cited by examiner

*Primary Examiner* — Tan Le
(74) *Attorney, Agent, or Firm* — Woods Oviatt Gilman LLP; Ronald J. Kisicki, Esq.; Dennis B. Danella, Esq.

(57) ABSTRACT

A device when installed between the physical gap between toilet partition panels provides a hook to hang personal items while the toilet is in use. The device also can be used to secure the toilet partition door to the toilet partition wall, preventing the door from being opened from the outside.

4 Claims, 9 Drawing Sheets

PORTABLE LOCK FOR TOILET STALLS

TECHNICAL FIELD

The present invention relates to a portable lock for use in toilet stalls. More specifically, the invention relates to a portable lock that can be used to hang personal items while the stall is in use. Still more specifically, the invention relates to a portable lock that can be used to hang personal items and secure the door of a toilet stall while the stall is in use.

BACKGROUND OF THE INVENTION

Toilet stalls are typically constructed of flat panels joined together by bracketry at certain points along their span. Where the edges of these panels come together to form a door jamb and an associated door, there is a physical gap that can be as much as a half of an inch. The invention disclosed within utilizes this physical gap to provide a hook for the convenience to the user of a toilet stall. In addition, the existing locks used in these stalls are not secure and often can be opened from either side of the door, either by hand or by common item like a coin. If the user of the toilet stall enters carrying a personal item (e.g. purse, garment bag, etc.) needing to be stored while the stall is in use, and if there is no hook located on the inside surfaces of the stall, the user will have to place their item(s) either on the floor or draped along the top of the toilet stall in peril of exposure to germs or theft. In addition, the existing locks provide no security from others opening the door from the outside.

SUMMARY OF THE INVENTION

What is presented is a portable hook that a user of a toilet stall can install to hang a personal item (e.g. purse or garment bag, etc.) while the stall is in use, and when installed between a door and a door jamb, secures the door preventing it from being opened from the outside. The device consists of two plates connected through their center with a threaded rod with a lever that draws the two plates closer together when rotated to a second position. When the lever is rotated to this second position, the plates move closer together compressing against the walls of the stall to a point where the device is held securely in place. The lever is of a shape that can be used as a hook for personal items after the plates are compressed together. The threaded rod is firmly attached to one plate, while the threaded rod passes through the other plate and attaches to an element of the lever.

The user enters the toilet stall and closes the door. This device is then inserted in the physical gap between the door and a fixed wall and slid down along this gap between the two, flat panels of the toilet stall. The lever is then rotated by the user, causing the two plates to come together while contacting with the door and door jamb, securing the door to the wall from the inside of the stall. The lever is shaped in such a way so that when it is rotated out, it presents a shape that locks the lever in place. The lever can then be used to securely hang personal items while the stall is in use.

BRIEF DESCRIPTION OF THE DRAWINGS

The present invention will now be described, by way of example, with reference to the accompanying drawings, in which.

Corresponding reference characters indicate corresponding parts throughout the several views. The exemplifications set out herein illustrate currently preferred embodiments of the invention, and such exemplifications are not to be construed as limiting the scope of the invention in any manner.

DESCRIPTION OF THE PREFERRED EMBODIMENTS

Figure 1:
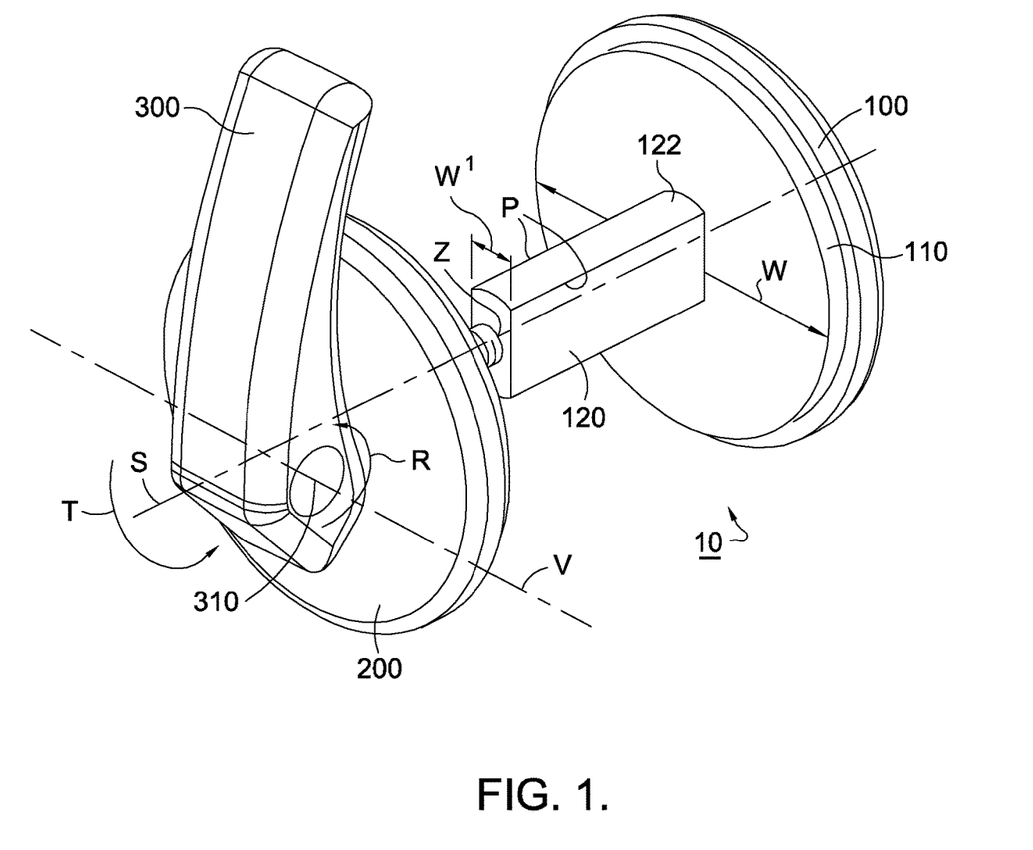
FIG. 1 is a full perspective view of the device.
Figure 2:
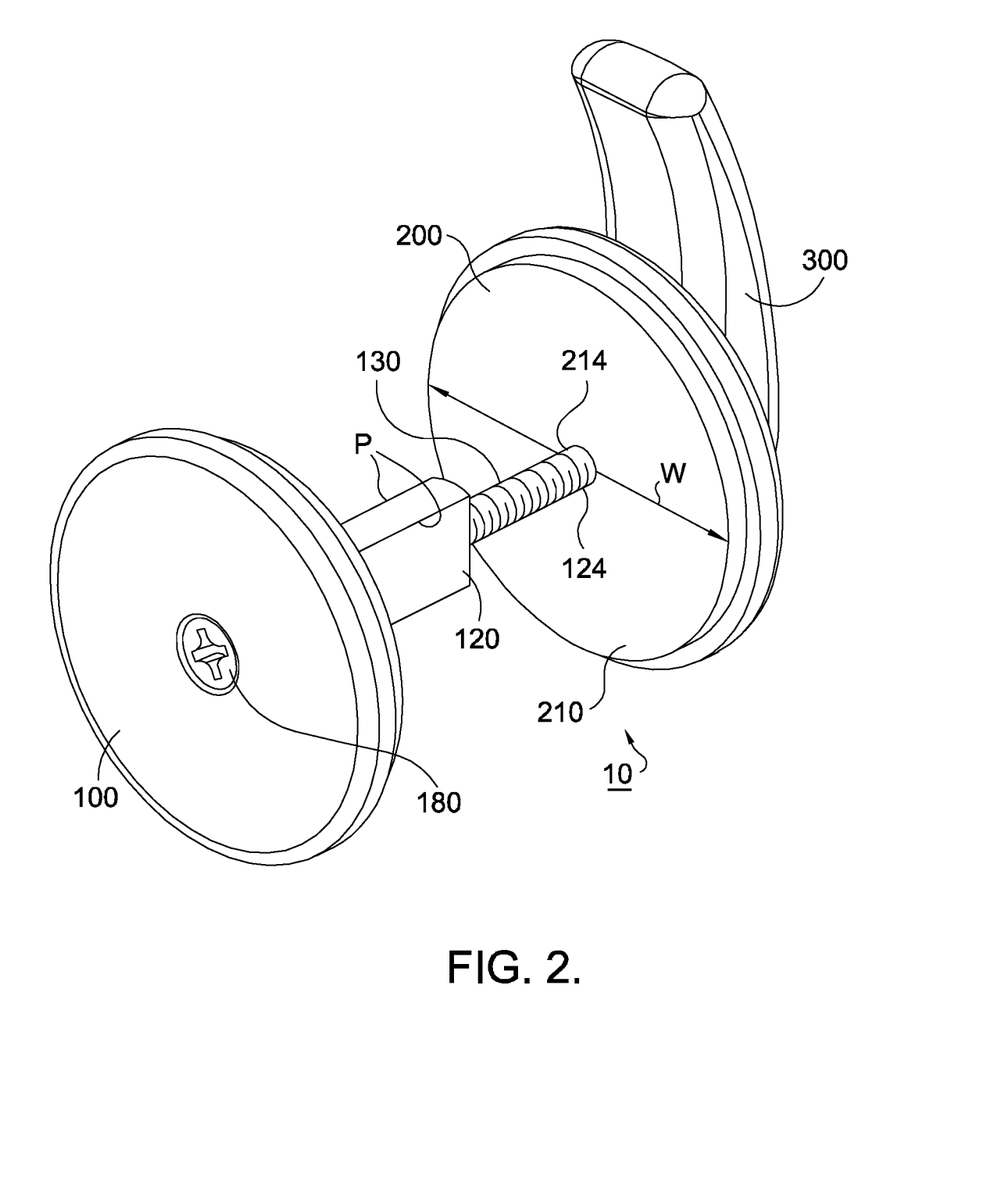
FIG. 2 is a full perspective view of the device reversed from FIG. 1.

Turning to FIGS. 1 and 2, a preferred embodiment of portable lock mechanism [10] is shown. Outside plate [100] includes outside face [110] having a width [W]. Outside face [110] may be made of a compressible material.

Figure 7:
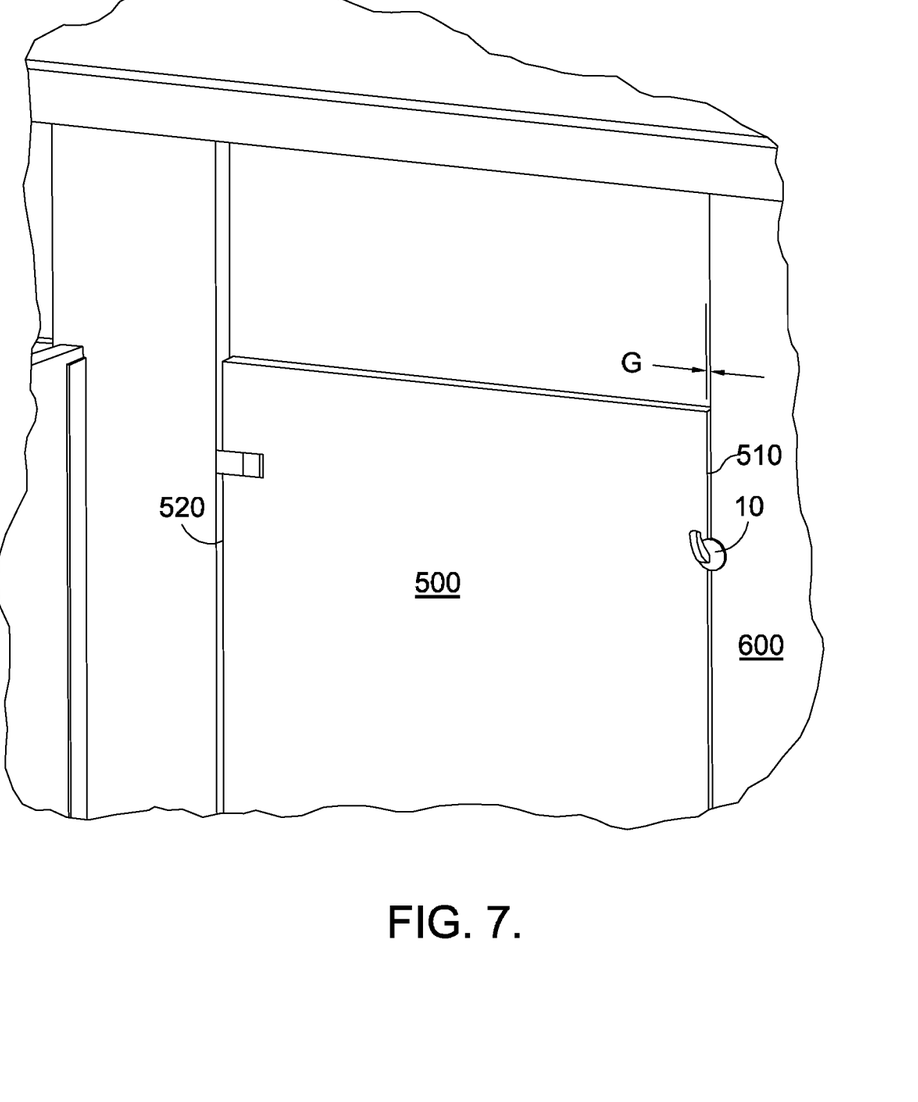
FIG. 7 is the same view as FIG. 6, but showing the device inserted into the gap between the door and the door jamb and slid down the panel into position.

A first terminal end [122] of center shaft [120] is securely attached to the outside plate [100] with a fastener [180] and centered about width [W]. The center shaft [120] has at least one profile [P] having a width [W] across profile [P] that is narrow enough to fit between the physical gap [G] between a leading edge [510] of the stall door [500], which is opposite of a hinged edge [520], and the door jamb [600] of an enclosure [550] such as a toilet stall (FIG. 7). Width [W] is measured along a line generally parallel with width [W].

The inside plate [200] of portable lock mechanism [10] includes outside surface [220] and inside face [210] having a width [W] generally equal in length to width [W] of the outside face [110] and measured along a line generally parallel with width [W] across profile [P]. Inside face [210] may be of the same compliant material as the outside face [110]. A second end [124] of center shaft [120] passes freely through orifice [214] of inside plate [200].

Figure 3:
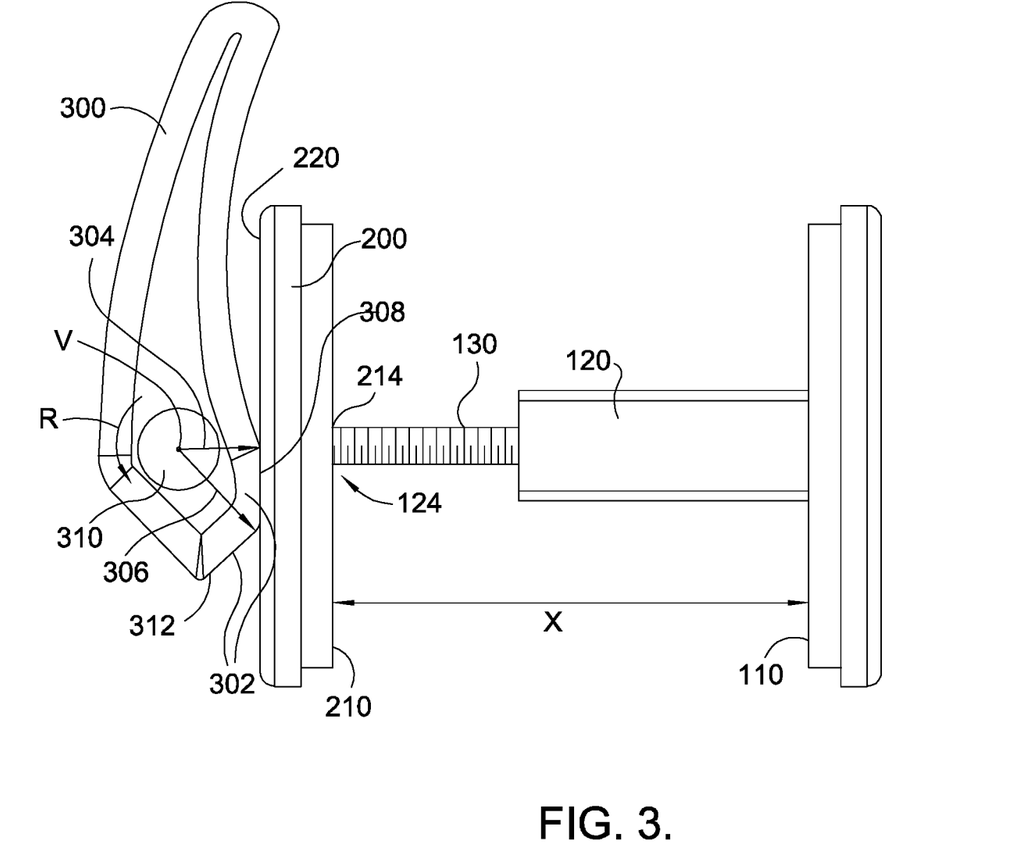
FIG. 3 is a side view of the device with the lever up.
Figure 4:
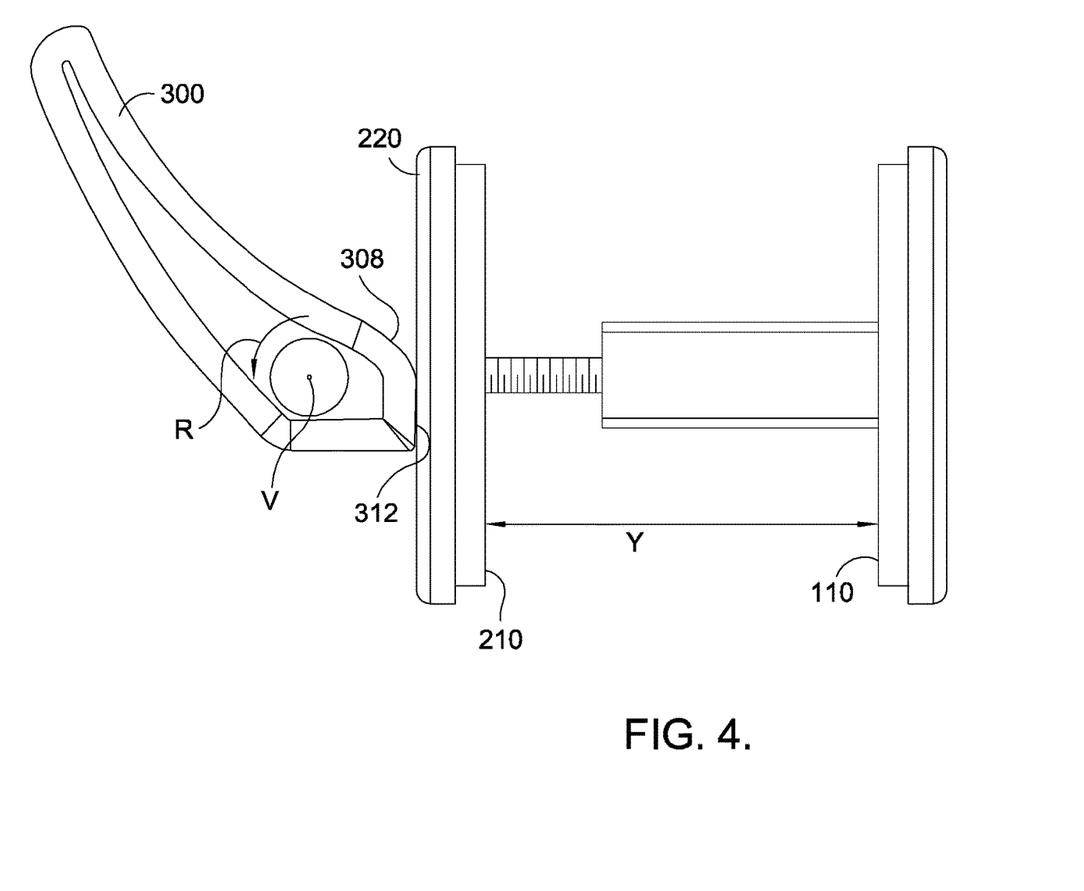
FIG. 4 is the same side view of the device, but with the lever down, showing how the two plates are being compressed together by the profile of the lever.

The lever [300] of portable lock mechanism [10] has a tube nut [310] that rotates freely within the lever [300] allowing the lever to pivot about axis [V] in a rotational path [R] from a first position shown in FIG. 3 to a second position shown in FIG. 4. Lever [300] further includes lobe surface [302] defining first cam radius [304] and second cam radius [306]. Thus, when lever [300] is in the first position (FIG. 3), first lobe segment [308] of lever [300] is placed in contact with outside surface [220] of inside plate [200], setting distance [X] between outside face [110] and inside face [210]. Then, when lever [300] is rotated about axis [V] to the second position (FIG. 4) so that second lobe segment [312]

of lever [300] is placed in contact with outer surface [220] of inside plate [200], distance [X] between outside face [110] and inside face [210] is reduced to distance [Y]. In this manner, once portable lock mechanism [10] is in place with profile [P] of center shaft [120] residing in gap [G] between door [500] and door jamb [600], lock mechanism [10] may be securely clamped in place by pivoting lever from its first position (FIG. 3) to its second position (FIG. 4), whereby door 500 is pinched between outside face 110 and inside face 210.

Second end [124] of center shaft [120] includes threaded rod [130] having longitudinal axis [Z]. FIG. 3 shows the threaded rod [130] threaded into the center shaft [120]. The threaded rod [130] passes freely through orifice [214] of inside plate [200], and is secured to the tube nut [310] located within the lever [300] in such a way so that when the lever [300] rotates in rotational direction [T] about swivel axis [S], wherein swivel axis [5] is coaxial with longitudinal axis [Z], the threaded rod [130] rotates to the same degree in the center shaft [120]. Referring to FIGS. 1, 3 and 4, rotating the lever on the threaded rod about swivel axis [S] changes the gap made between the inside and outside plates to compensate for different door and door jamb thicknesses of a toilet stall.

Once again, FIG. 3 shows the device with the lever [300] in the upright position, while FIG. 4 shows the device with the lever [300] rotated about axis [V] in the rotated position. The distance between the plates is reduced [X is greater than Y] when the lever [300] is rotated. This is caused by a change in the cam radii of lobe surface [302] that is presented to the inside plate [200] that moves the rotational axis a1 of lever [300] way from the inside plate [200], while the outside plate [100] remains in place with respect to the rotational axis [V] given the physical connection between the outside plate [100] and the center shaft [120], threaded rod [130] tube nut [310], and rotational axis [V].

Figure 5:
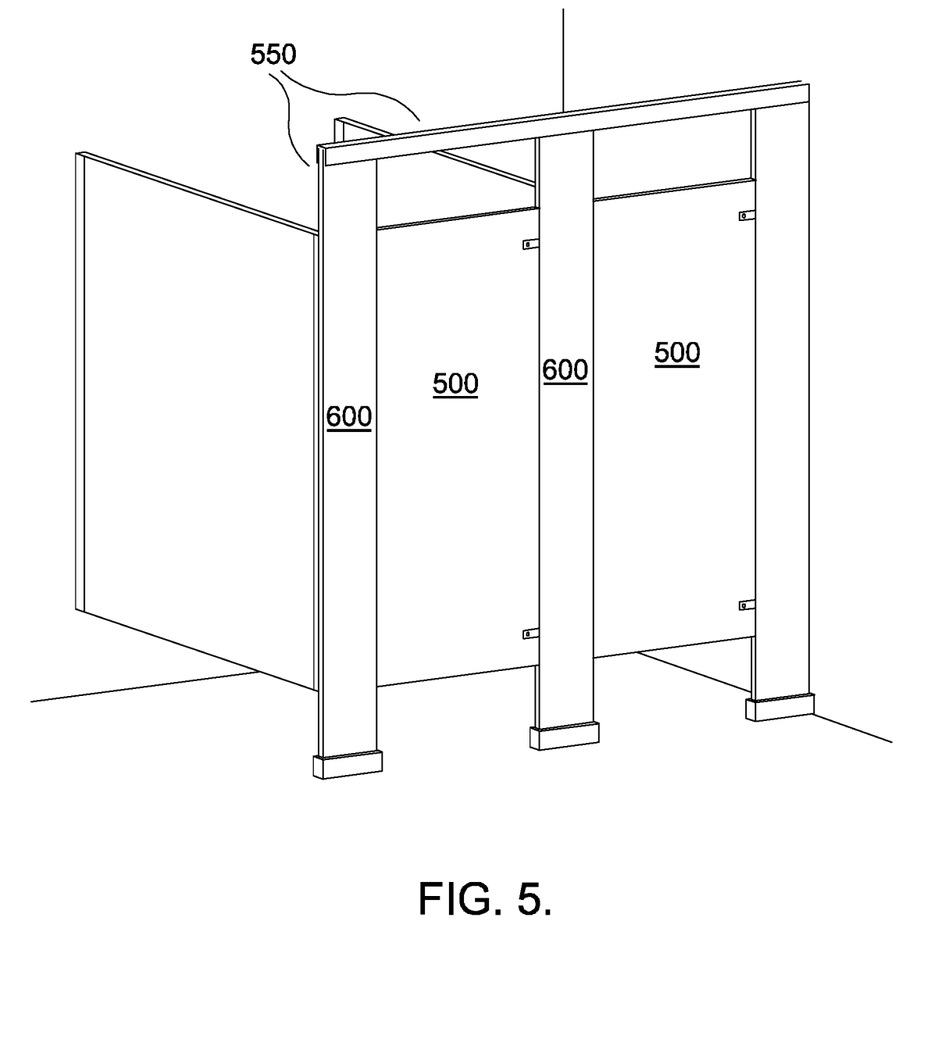
FIG. 5 is a perspective view of a pair of toilet stalls of typical construction.
Figure 6:
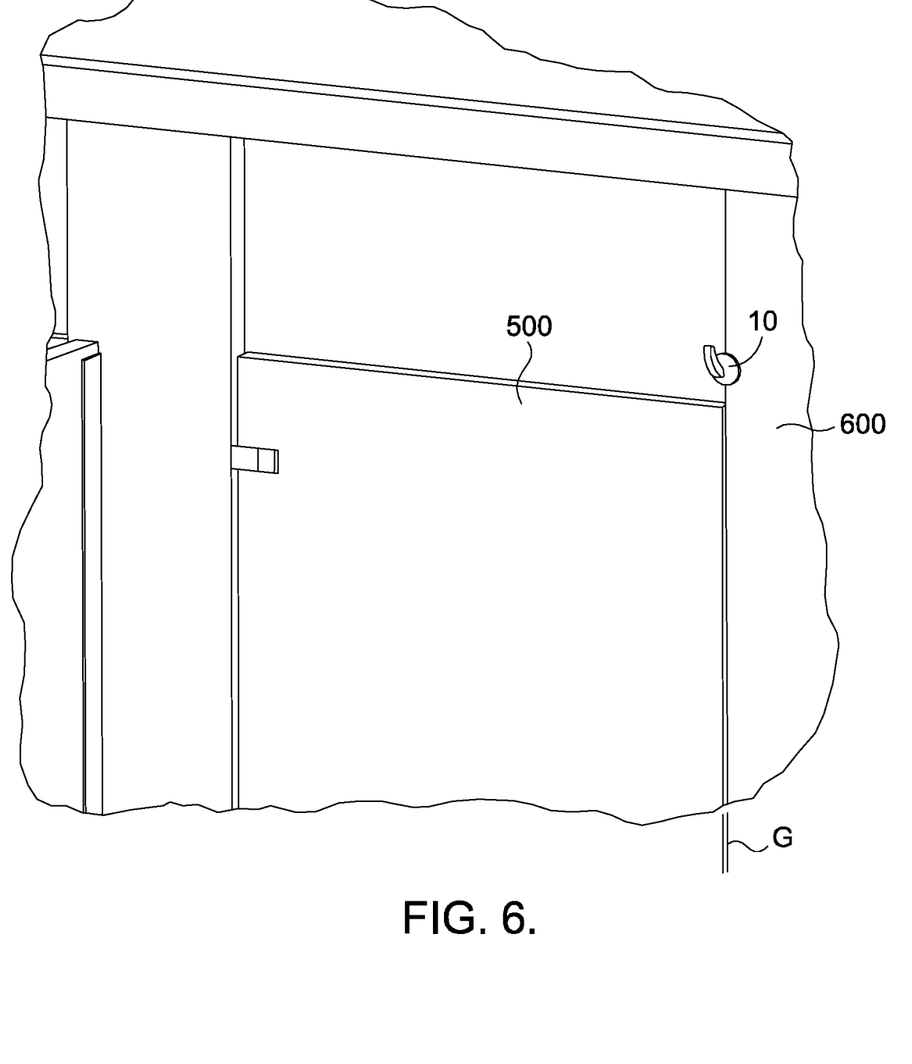
FIG. 6 is a perspective view on the inside of the toilet stall with the door closed and the device in position to be inserted into the gap between the door and the door jamb.
Figure 8:
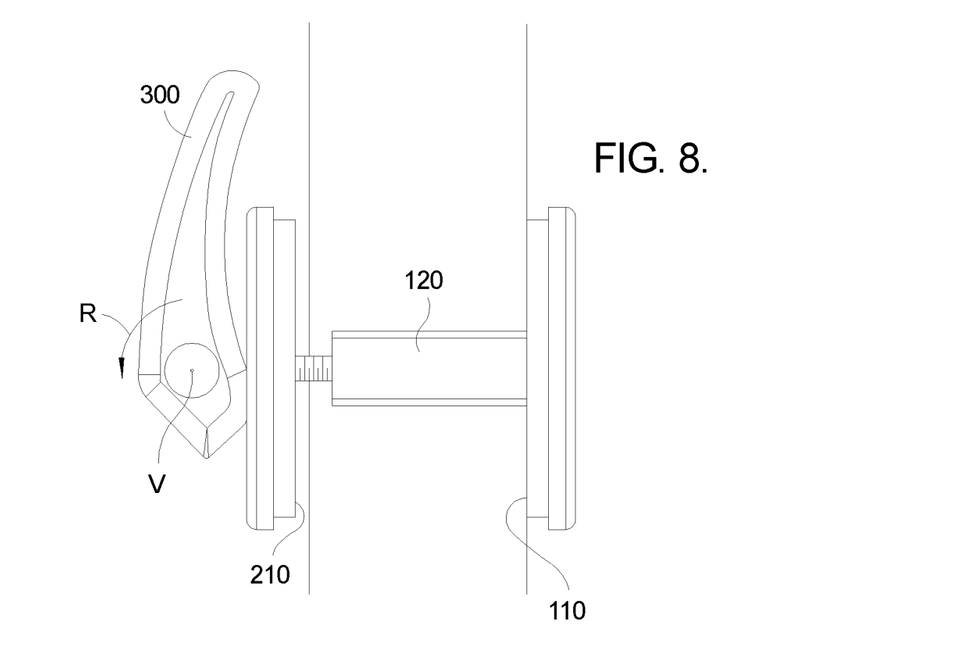
FIG. 8 is a side section view of the device with lever up installed on the door but with the door jamb removed for clarity.
Figure 9:
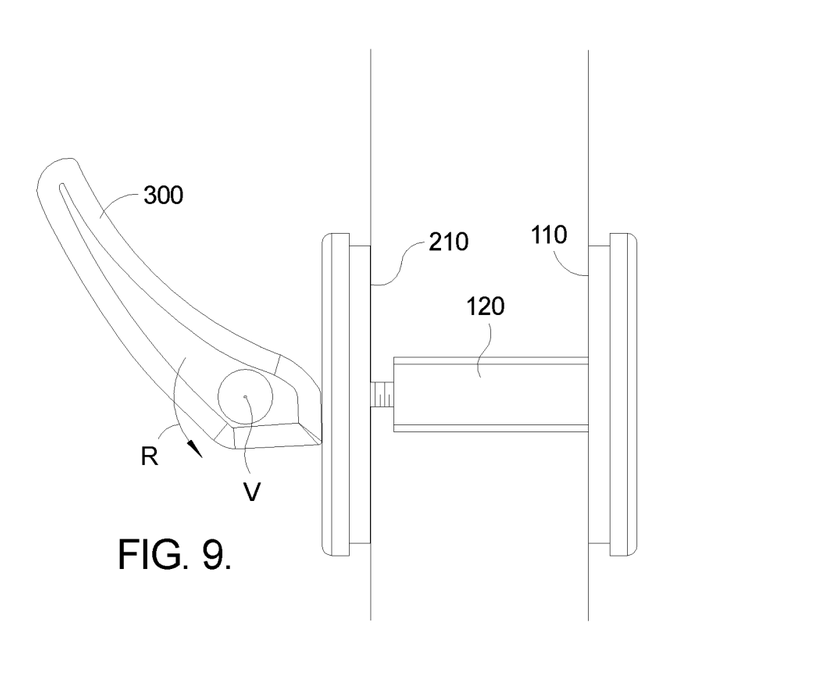
FIG. 9 is the same side view of FIG. 8, but with the lever down showing how the device compresses the door, allowing it to secure the door and provide a hook that can be used to hang personal items.
Figure 10:
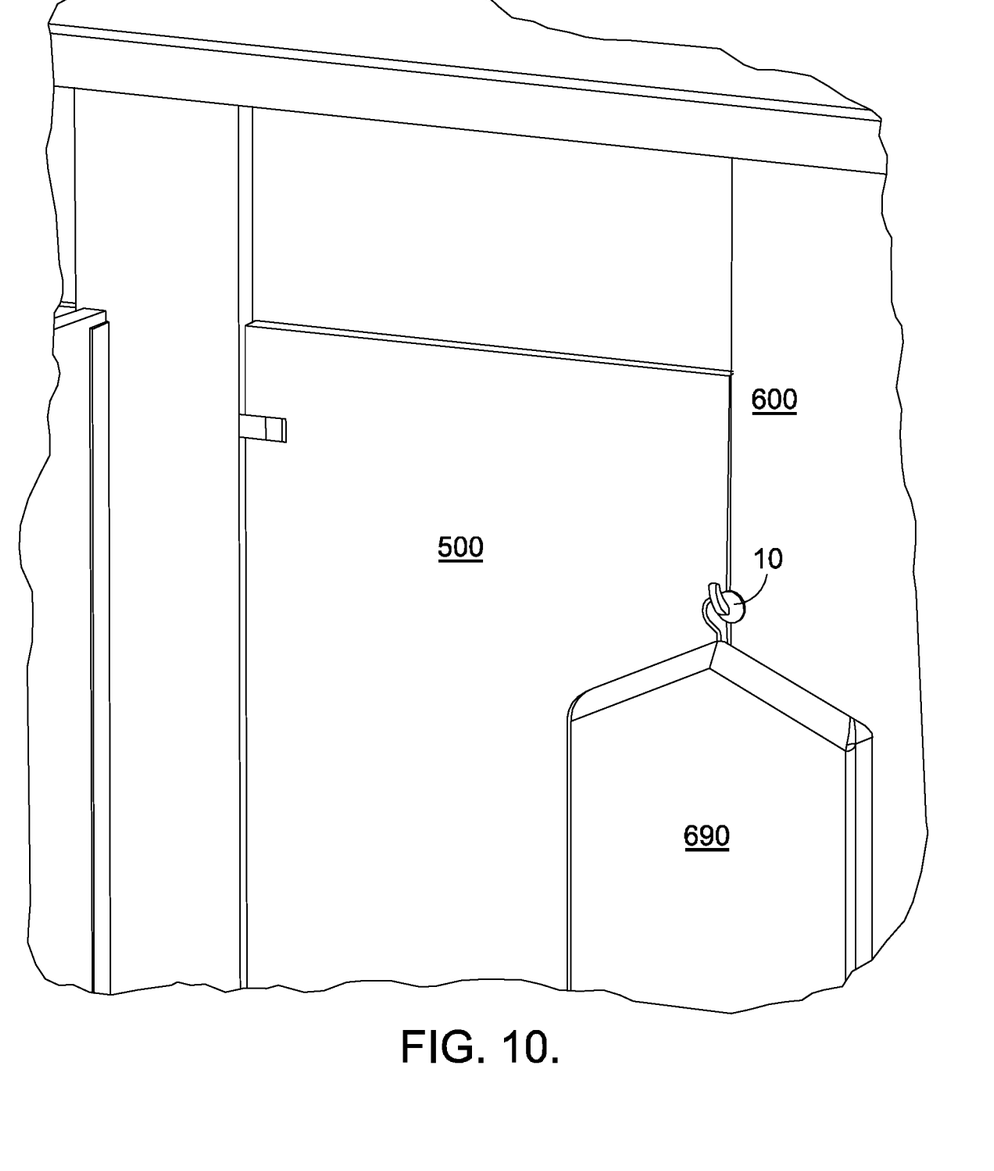
FIG. 10 is the same side view as FIG. 6, but showing how once the device is secured to the door and door jamb, it can be used to hang a garment bag.

FIG. 5 shows a typical toilet stall including door [500] and associated door jamb [600]. In reference to FIGS. 1-9, from the inside of the stall and once the door has been closed, width [W] of profile [P] is inserted in the gap [G] that exists between the door [500] and door jamb [600], with the door and the door jamb residing between the inside and outside faces [210, 110], with the lever [300] of lock mechanism [10] residing on the inside side of the toilet stall. This distance between the faces of outside plate [100] and inside plate [200] need to be far enough apart to be loose enough to allow the device to slide down gap [G]. If the distance is not correct, the lever [300] can be rotated about rotational direction [T] prior to profile [P] being inserted to increase distance X between the plates until the respective faces are far enough apart to allow the mechanism to be inserted between the door and door jamb of a toilet stall. Once the device is in position within the toilet stall (FIG. 7), the lever [300] can be rotated about rotational path [R] with respect to the tube nut (FIG. 8), pushing the inside plate [200] closer to the outside plate [100], firmly securing the device in place (FIG. 9). The lever can now be used to hang personal items [690] from the portable lock mechanism [10] (FIG. 10) while it also secures the door, preventing the door from being opened from the outside.

What is claimed is:

1. A portable lock mechanism for securing a door of a toilet stall to an adjacent door jamb, wherein a gap is provided between said door jamb and a leading edge of said door opposite a hinged edge of said door when said door is closed, said portable lock mechanism comprising:

a. a first plate including a first plate face having a width, wherein said width is greater than said provided gap;
   b. a shaft having a first end and a second terminal end, wherein said second terminal end is rigidly fixed to said first plate, wherein said shaft is centered about said width of said first plate face and disposed perpendicular to said first plate face, wherein said shaft includes a profile having a width measured along a line generally parallel with said width of said first plate face and wherein said width of said shaft profile is less than said provided gap;
   c. a second plate including a second plate face, wherein said second plate face includes an orifice and a width generally equal to said width of said first plate face, wherein said second plate face is disposed parallel with said first plate face, wherein said first end of said shaft passes freely through said orifice; and
   d. a lever connected to said first end of said shaft and rotatable about a lever axis, wherein said lever includes a lobe surface having a first lobe segment and a second lobe segment, wherein said first lobe segment defines a first cam radius extending from said lever axis and said second lobe segment defines a second cam radius extending from said lever axis, wherein said second cam radius is greater than said first cam radius, wherein said lever is configured to be moved between a first position wherein said first lobe segment is in contact with an outside surface of said second plate and a second position wherein said second lobe segment is in contact with said outside surface of said second plate, wherein when in said first position, a first distance is established between said first plate face and said second plate face, wherein when in said second position, a second distance is established between said first plate face and said second plate face, wherein said second distance is less than said first distance and wherein when in said second position, said door is secured to said adjacent door jamb.

2. The portable lock mechanism of claim 1 wherein said second end of said shaft includes a threaded rod having a longitudinal axis, wherein said lever is connected to said threaded rod, and wherein when said lever is rotated about a swivel axis coaxial with said longitudinal axis of said threaded rod, said first plate is moved away from said lever.

3. A system comprising:
   a door jamb;
   a toilet stall door including a hinged edge and a leading edge opposite of said hinged edge, wherein a gap is provided between said door jamb and said leading edge of the toilet stall door when the toilet stall door is closed;
   a portable lock mechanism for securing said toilet shall door to said door jamb, said portable lock mechanism comprising:
   a. a first plate including a first plate face having a width, wherein said width is greater than said provided gap;
   b. a shaft having a first end and a second terminal end, wherein said second terminal end is rigidly fixed to said first plate, wherein said shaft is centered about said width of said first plate face and disposed perpendicular to said first plate face, wherein said shaft includes a profile having a width measured along a line generally parallel with said width of said first plate face and wherein said width of said shaft profile is less than said provided gap;
   c. a second plate including a second plate face, wherein said second plate face includes an orifice and a width generally equal to said width of said first plate face, wherein said second plate face is disposed parallel with said first plate face, wherein said first end of said shaft passes freely through said orifice; and d. a lever connected to said first end of said shaft and rotatable about a lever axis, wherein said lever includes a lobe surface having a first lobe segment and a second lobe segment, wherein said first lobe segment defines a first cam radius extending from said lever axis and said second lobe segment defines a second cam radius extending from said lever axis, wherein said second cam radius is greater than said first cam radius, wherein said lever is configured to be moved between a first position wherein said first lobe segment is in contact with an outside surface of said second plate and a second position wherein said second lobe segment is in contact with said outside surface of said second plate, wherein when in said first position, a first distance is established between said first plate face and said second plate face, wherein when in said second position, a second distance is established between said first plate face and said second plate face, wherein said second distance is less than said first distance and wherein when in said second position, said toilet stall door is secured to said door jamb.

4. A system in accordance with claim 3 wherein said second end of said shaft includes a threaded rod having a longitudinal axis, wherein said lever is connected to said threaded rod, and wherein when said lever is rotated about a swivel axis coaxial with said longitudinal axis of said threaded rod, said first plate is moved away from said lever.

* * * * *